United States Patent [19]
Campagnolo

[11] Patent Number: 5,845,537
[45] Date of Patent: Dec. 8, 1998

[54] CONTROL DEVICE FOR A BICYCLE DERAILLEUR, WITH A CONTROL MEMBER ROTATABLY MOUNTED ON THE BICYCLE HANDLEBAR

[75] Inventor: Valentino Campagnolo, Vicenza, Italy

[73] Assignee: Campagnolo S.r.l., Vicenza, Italy

[21] Appl. No.: 719,701

[22] Filed: Sep. 27, 1996

[30] Foreign Application Priority Data

Oct. 31, 1995 [IT] Italy .................................. TO95A0872

[51] Int. Cl.⁶ .............................. B62K 23/04; G05G 5/06
[52] U.S. Cl. ............................. 74/473.28; 74/489; 74/506
[58] Field of Search .............................. 74/475, 489, 505, 74/506, 473.28

[56] References Cited

U.S. PATENT DOCUMENTS

| | | | |
|---|---|---|---|
| 619,103 | 2/1899 | Weyde | 74/489 X |
| 4,461,189 | 7/1984 | Rottenkolber et al. | 74/506 X |
| 5,134,897 | 8/1992 | Romano | 74/506 X |
| 5,197,927 | 3/1993 | Patterson et al. | 74/506 X |

FOREIGN PATENT DOCUMENTS

| | | | |
|---|---|---|---|
| 5-32191 | 2/1993 | Japan | 74/489 |
| 530062 | 12/1940 | United Kingdom | 74/489 |

*Primary Examiner*—Allan D. Herrmann
*Attorney, Agent, or Firm*—Sughrue, Mion, Zinn, Macpeak & Seas, PLLC

[57] ABSTRACT

A device for controlling a bicycle derailleur comprises a control member which is rotatably mounted on the handlebar adjacent to a fixed handgrip. The various operative positions of the rotatable control member are defined by indexing means comprising a toothed wheel which is rigidly connected to said rotatable control member and a plurality of resilient engagement members carried by said supporting body and able to selectively engage the vanes between the teeth of the toothed wheel. The supporting body has a C-shaped configuration with two wings which can be clamped by a screw which is also used to rotatably support a pulley on which the flexible control cable actuated by the rotatable control member is engaged.

3 Claims, 3 Drawing Sheets

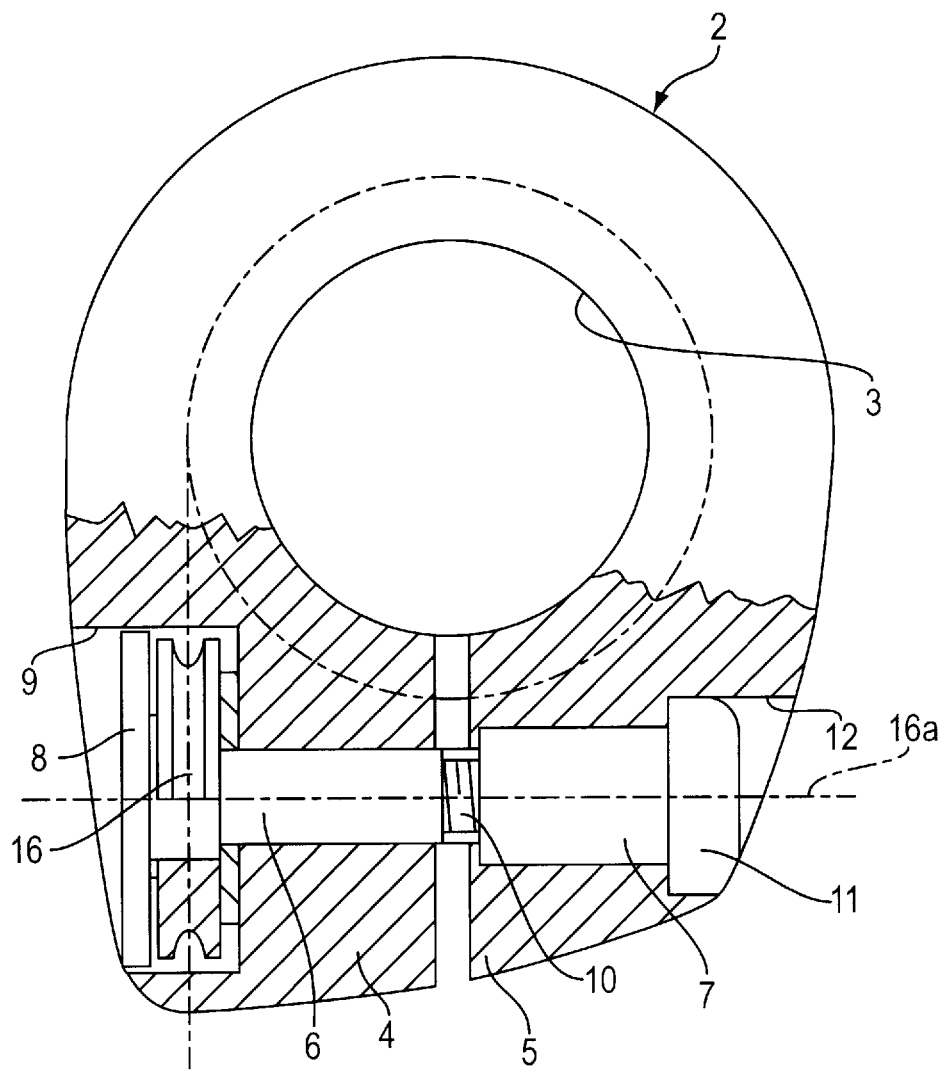

CONTROL DEVICE FOR A BICYCLE DERAILLEUR, WITH A CONTROL MEMBER ROTATABLY MOUNTED ON THE BICYCLE HANDLEBAR

BACKGROUND OF THE INVENTION

The present invention relates to a control device of a bicycle derailleur, particularly for mountain-bikes or the like, of the type comprising a control member which is to be rotatably mounted on a bicycle handlebar adjacent to a handgrip fixed to one end of the handlebar, and connected to a winding reel for a flexible cable controlling the derailleur, and indexing means able to provide a reference for the various operative positions of the rotatable control member corresponding to respective operative positions of the derailleur.

A control device of the above indicated type is for example described and shown in documents EP-A-0 571 631 and EP-A-0 585 474.

In recent years there have been proposed devices for controlling the rear or front derailleur of a bicycle, which are particularly to be used on mountain-bikes, comprising a rotatable control member constituted by the conventional handgrip provided at one end of the handlebar. In this case, the whole handgrip is rotatably mounted on the handlebar and is rigidly connected to a winding reel for the flexible cable controlling the derailleur. Devices of this type are for example disclosed in FR-A-2 575 434 and in Italian Patent application No. 67905-A/89, laid open to public inspection on 20 Apr., 1991 and filed by the same Applicant.

More recently there have been proposed control devices in which the handgrip is fixed, as in a conventional handlebar, and the control is provided by a member rotatably mounted on the handlebar adjacent to the inner end of the handgrip. This member may be actuated by the cyclist with two fingers of the hand, without leaving the handgrip of the handlebar. As indicated above, a device of this type is for example disclosed in EP-A-0 571 631 and EP-A-0 585 474.

SUMMARY OF THE INVENTION

The object of the present invention is that of providing a control device of this latter type described above, which is efficient and reliable and at the same time of simple and unexpensive manufacture.

In order to achieve this object, the invention provides a device having the features indicated at the beginning of the present description and characterized further by that said indexing means are constituted by a toothed wheel rigidly connected to the rotatable control member and cooperating with a resilient engagement member carried by a support body fixed to the handlebar and able to selectively engage the vanes between the teeth of said toothed wheel to provide a snap-type reference of the operative positions of the rotatable member.

In a preferred embodiment, said indexing means comprise a plurality of resilient engagement members provided at equi-angularly spaced positions around the toothed wheel and constituted by pin springs.

Yet with reference to said preferred embodiment, said supporting body freely rotatably supports a pulley on which the flexible control cable is engaged. Said supporting body has a general C-shaped configuration, in order to be clamped on the handlebar, with two wings engaged by a clamping screw, said screw being also used to rotatably support said pulley.

Preferably the pin springs are carried by a separate element of said supporting body which is fixed thereto. In this manner, the clamping of the two wings of the supporting body does not change the position of the pin springs with respect to the toothed wheel.

Due to the above features, the control device according to the invention is at the same time simple, constituted by a reduced number of parts, efficient and reliable.

BRIEF DESCRIPTION OF THE DRAWINGS

Further features of the invention will become apparent from the description which follows with reference to the annexed drawings, given purely by way of non limiting example, in which:

FIG. 3 is a view, partially in cross-section of a detail of FIG. 1.

DETAILED DESCRIPTION OF THE INVENTION

Figure 1:
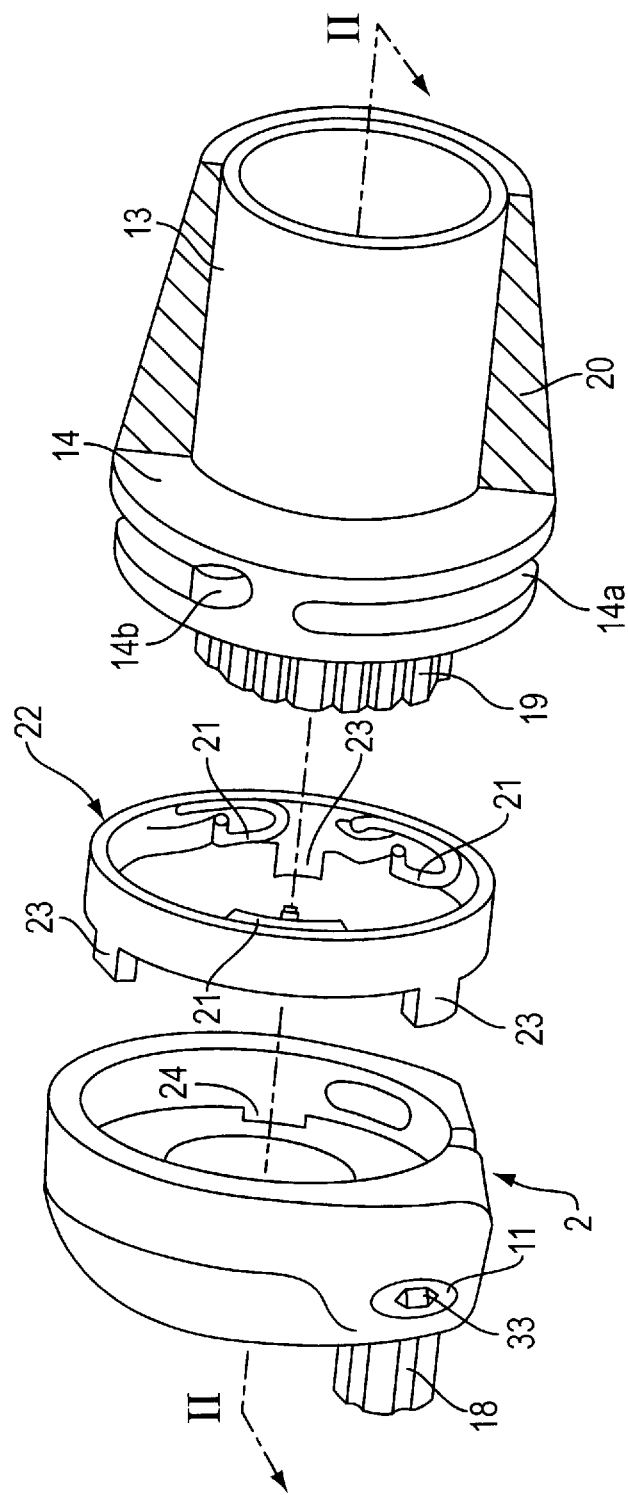
FIG. 1 is a perspective exploded view of the device according to the invention.

With reference to the drawings, numeral 1 (FIG. 2) designates the end portion of a tube constituting the handlebar of a mountain-bike on which the device according to the invention is mounted. This device comprises a supporting body 2 having a general C-shaped configuration (FIG. 3) with a circular central aperture 3, which receives the tube 1 of the handlebar, and two wings 4, 5 which are clamped to each other by a bolt comprising a screw 6 and a nut 7. The screw 6 has a head 8 which is received within a seat 9 of wing 4, and a threaded end portion 10. This threaded end portion 10 is engaged by nut 7 which has a head 11 received in a seat 12 of wing 5 and having a cavity 33 (FIG. 1) for engagement of a wrench. By tightening the nut 7 on screw 6, the two wings 4, 5 move towards each other so as to lock by friction the supporting body 2 on the tube of the handlebar 1. On this tube there is rotatably mounted a member 13 for controlling a rear or front derailleur of a bicycle (two control devices may be provided according to the invention adjacent to the two handgrips of the handlebar, respectively for controlling the front and rear derailleur).

The rotatable control member 13 is constituted by a tube formed in one piece with a reel 14 having a circumferential groove 14a for winding a flexible cable 15 which is for controlling the derailleur. The groove 14a has an enlarged end 14b (FIG. 1) wherein one end of the flexible cable is locked. The flexible cable 15 is engaged around a pulley 16 which is freely rotatably mounted on the supporting body 2. According to the invention, for rotatably supporting the pulley 16 the same screw 6 for clamping the supporting body 2 is used, which therefore acts also as a supporting shaft for pulley 16, in order to enable rotation of the latter around its axis 16a. Starting from the winding reel 14, the flexible control cable 15, after engagement around pulley 16 (FIG. 2) is guided through a hole 17 formed in the supporting body 2 and projects outside through a member 18 of the conventional type used for connecting the cable sheath (not shown).

On the inner edge of the tube forming the rotatable control member 13, at the end of which reel 14 is provided, there is fixed a toothed wheel 19, which is therefore connected for rotation to the rotatable control member 13. Furthermore, with reference to FIG. 1, the tubular part of the rotatable control member 13 is coated with a layer 20, for example of rubber or plastics, to render its actuation with the fingers easier. In the embodiment shown, the toothed wheel 19 cooperates with three resilient engagement members 21, constituted by three pin springs each having a free springing end portion and the opposite end anchored to a ring 22 provided with axial appendages 23 for fitting within a seat 24 (FIG. 1) of the supporting body 2.

The toothed wheel 19 and the resilient engagement members 21 form indexing means able to provide a reference of the various operative positions of the rotatable control member 13 corresponding to the different operative positions of the derailleur. The displacement of the rotatable member 13 from an operative position to another operative position is therefore detected by the cyclist due to the snap engagement of the resilient members 21 inside the vanes between the teeth of wheel 19.

Figure 2:
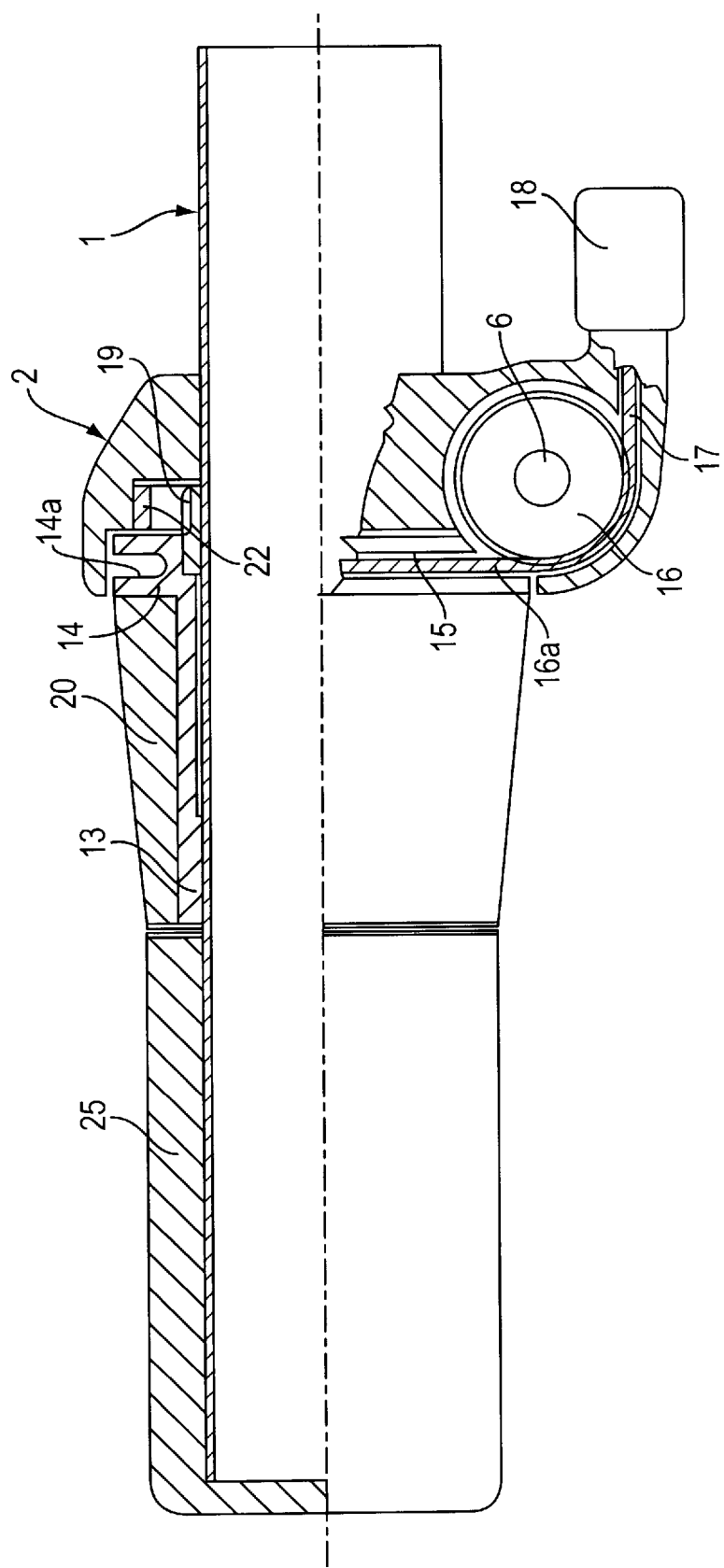
FIG. 2 is a view in cross-section of the device in an assembled condition, along line II—II of FIG. 1.

With reference to FIG. 2, the tube 1 of the handlebar projects beyond the rotatable control member 13 with an end portion on which the handgrip 25 is fixed. The device therefore can be actuated by the cyclist while keeping his hand on the handgrip 25 and moving the rotatable member 13 with only two fingers of the hand (typically the thumb and the four fingers).

As clearly apparent from the foregoing description, the device is characterized by a reduced number of parts (particularly due to that the clamping bolt 6 is used also as a supporting shaft for the pulley 16) and therefore is simple and unexpensive to be manufactured, while having an efficient and reliable operation.

Naturally, while the principle of the invention remains the same, the details of construction and the embodiments may widely vary with respect to what has been described and illustrated purely by way of example, without departing from the scope of the present invention.

What is claimed is:

1. Control device for a bicycle derailleur, comprising a control member which is to be rotatably mounted on a handlebar of the bicycle adjacent to a handgrip fixed to one end of the handlebar and connected to a reel for winding a flexible cable for controlling the derailleur, and indexing means able to provide a reference of the various operative positions of the rotatable control member corresponding to respective operative positions of the derailleur, wherein said indexing means are constituted by a toothed wheel rigidly connected to the rotatable control member and cooperating with a resilient engagement member carried by a supporting body fixed to the handlebar and able to selectively engage the vanes between the teeth of said toothed wheel to provide a snap-type reference of the operative positions of the rotatable member, wherein said supporting body freely rotatably supports a pulley on which said flexible control cable is engaged, wherein said supporting body has a general C-shaped configuration, to clamp the handlebar, with two wings engaged by a clamping screw, said screw being also used to rotatably support said pulley.

2. Control device according to claim 1, wherein said indexing means comprise a plurality of resilient engagement members equiangularly spaced around the toothed wheel and constituted by pin springs.

3. Device according to claim 2, wherein said pin springs are carried by an element separate from the supporting body and fixed thereto.

\* \* \* \* \*